United States Patent [19]

Easton et al.

[11] Patent Number: 4,603,380

[45] Date of Patent: Jul. 29, 1986

[54] DASD CACHE BLOCK STAGING

[75] Inventors: Malcolm C. Easton, San Jose, Calif.; John H. Howard, Pittsburgh, Pa.

[73] Assignee: International Business Machines Corporation, Armonk, N.Y.

[21] Appl. No.: 510,130

[22] Filed: Jul. 1, 1983

[51] Int. Cl.[4] .................... G06F 12/00; G06F 12/12; G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,336,582 | 8/1967 | Beausoleil et al. | 364/200 |
| 3,541,529 | 11/1970 | Nelson | 364/200 |
| 3,564,502 | 2/1971 | Boehner et al. | 364/200 |
| 3,725,864 | 4/1973 | Clark et al. | 364/200 |
| 3,938,097 | 2/1976 | Niguette | 364/200 |
| 4,195,342 | 3/1980 | Joyce et al. | 364/200 |
| 4,207,609 | 6/1980 | Luiz et al. | 364/200 |
| 4,322,795 | 3/1982 | Lange et al. | 364/200 |
| 4,394,732 | 7/1983 | Swenson et al. | 364/200 |
| 4,394,733 | 7/1983 | Swenson | 364/200 |
| 4,423,479 | 12/1983 | Hanson et al. | 364/200 |
| 4,429,363 | 1/1984 | Duke et al. | 364/200 |
| 4,437,155 | 3/1984 | Sawyer et al. | 364/200 |
| 4,489,378 | 12/1984 | Dixon et al. | 364/200 |
| 4,490,782 | 12/1984 | Dixon et al. | 364/200 |
| 4,500,954 | 2/1985 | Duke et al. | 364/200 |
| 4,506,323 | 3/1985 | Pusic et al. | 364/200 |

OTHER PUBLICATIONS

Bardsley et al, "Address Control of Fragmented Buffer Spaces Byte Synchronized with Streamed Records", U.S. application Ser. No. 06/362,827, filed Mar. 29, 1982.

Easton et al, "Use Bit Scanning in Replacement Decisions", IEEE Transactions on Computers, vol. C-28, pp. 133-141, Feb. 1979.

Smith, "Cache Memories", Computing Surveys, vol. 14, No. 3, pp. 473-530, Sep. 1982.

Hayes, "Computer Architecture and Organization", McGraw Hill Computer Science Series, pp. 385-388, 1978.

Primary Examiner—James D. Thomas
Assistant Examiner—William G. Niessen
Attorney, Agent, or Firm—R. Bruce Brodie

[57] ABSTRACT

A method for Direct (DASD) cache management that reduces the volume of data transfer between DASD and cache while avoiding the complexity of managing variable length records in the cache. This is achieved by always choosing the starting point for staging a record to be at the start of the missing record and, at the same time, allocating and managing cache space in fixed length blocks. The method steps require staging records, starting with the requested record and continuing until either the cache block is full, the end of track is reached, or a record already in the cache is encountered.

7 Claims, 6 Drawing Figures

TYPICAL MEMORY HIERARCHY
PRIOR ART

FIG. 1

PRIOR ART

DIRECTORY FORMAT

TRACK DESCRIPTOR CONTENTS

| BITS | ITEM |
|---|---|
| 5 | DEVICE NUMBER |
| 10 | CYLINDER NUMBER |
| 4 | HEAD NUMBER |
| 12 | INDEX OF NEXT TRACK DESCRIPTOR ON HASH CHAIN |
| 14 | INDEX OF FIRST DATA BLOCK OF TRACK |
|  | FLAGS: |
| 19 | SPARES |
| 64 | TOTAL (8 BYTES) |

BLOCK DESCRIPTOR CONTENTS

| BITS | ITEM |
|---|---|
| 14 | INDEX OF NEXT BLOCK OF TRACK ON CIRCULAR CHAIN OF BLOCK DESCRIPTORS |
|  | FLAGS: |
| 1 |   SPARES 15 |
| 1 |   LAST RECORD CONTINUES IN NEXT BLOCK |
| 1 |   BLOCK HAS BEEN REFERENCED |
| 1 |   BLOCK CONTAINS MODIFIED RECORDS |
| 14 | SPARES |
| 64 | ID (COUNT) FIELD OF FIRST RECORD IN BLOCK |
| 64 | ID (COUNT) FIELD OF FIRST RECORD FOLLOWING BLOCK |
| 160 | TOTAL (20 BYTES) |

CURRENT PRACTICE
EXAMPLE

ALLOWED STAGING UNITS:

FIG. 6

DASD CACHE BLOCK STAGING

TECHNICAL FIELD

This invention relates to cache management, and more particularly, to directory managed methods for replacement of fixed block extents in DASD-backed cache.

BACKGROUND

Machine implementable page or other fixed block replacement methods have been used to control the movement of pages (fixed blocks) and to affect the dynamic association between the logical address space and the physical address space of a storage hierarchy. Relatedly, it is art recognized that a hierarchical storage system having a least recently used (LRU) or most recently used (MRU) page replacement policy requires a substantially smaller number of pages (fixed blocks) subject to an accessible demand paging regimen than a single-level store. The performance of caches (directory managed buffered stages) is characterized by hit/miss ratios. A "hit" means that a READ reference to the cache generated by a requesting CPU executable process locates the data item it desires in the high-speed cache, rather than in a lower speed backing store. A "hit" with respect to a WRITE reference is made when the CPU executable process through the cache manager finds a counterpart location in a partially full buffer to overwrite. In this regard, a "miss" is registered if the data is unavailable in cache with respect to a READ reference, or, if an item must be destaged from the cache in order to make room for a WRITE reference.

If data must be destaged or staged up between the small high-speed cache and the larger, but slower backing store, staging algorithms are required. Popular algorithms, such as LRU or MRU, maintain in the cache inventory those items which, more likely than not, will be referenced by a CPU executable process in the future. A cache not containing a referenced item and otherwise full must remove one of its data elements so that it can be replaced by the requested item. Thus, a system tries to replace the least recently referenced item under the assumption that items which have not been referenced for a long time will not likely be referenced in the future.

A disk cache is a cache or buffer used to hold portions of the disk address space contents. It differs from a CPU cache by its physical location within the storage subsystem and its responsiveness to channel command words.

In operation, when a CPU executing process references information not stored within its CPU cache or main memory, reference is made to a storage subsystem external to the CPU. In the prior art as for example in Clark et al, U.S. Pat. No. 3,725,864, "Input/Output Control" and Luiz et al, U.S. Pat. No. 4,207,609, "Path Independent Device Reservation and Reconnection in a Multi-CPU and Shared Device Access System", there is described the transfer of data to and from a CPU and the accessed locations of storage devices. Such systems employ a physical path connection involving a channel, a control unit communicating with the channel on one side in an asynchronous relationship and selected devices on the other side. The operating system of the CPU initiates the transfer by a START I/O instruction. This causes control to be relinquished to a series of channel command or command words (CCW's). A sequence or chain of channel commands is, in turn, sent from the CPU over the channel to the control unit for selecting and accessing the storage device as well as effectuating the data movement across the interface. Both the Clark and Luiz patents also describe the adaptive disconnection and reconnection of channels and devices thereby making the CPU and device association path independent.

Caches in the form of either associative or random access memory have access times in nanoseconds whereas DASD's have access times in terms of milliseconds. By locating a LRU/MRU managed cache within a DASD storage control unit, there exists an expectation that a high hit ratio of CCW references would substantially increase throughput. This derives from the fact that most of the references are answered in microseconds while only a minority must take the milliseconds required for staging from DASD to cache.

In current designs for DASD cache, when a cache "miss" occurs, the record stored on a DASD track required by the reference plus all the records following that record on the same track are staged to the cache buffer. In this regard, the conventional unit of data management within the cache is the DASD track. This is convenient because DASD tracks are of equal size although the records contained therein may be of different sizes.

The pertinent prior art includes Niguette et al, U.S. Pat. No. 3,938,097, "Memory and Buffer Arrangement for Digital Computers", issued Feb. 10, 1976; Nelson, U.S. Pat. No. 3,541,529, "Replacement System", issued Nov. 17, 1970; Bardesley et al, U.S. Ser. No. 362,827, "Address Control of Fragmented Buffer Spaces Byte Synchronized with Streamed Records", filed Mar. 29, 1982, now abandoned; and Easton et al, "Use Bit Scanning in Replacement Decisions", 28 IEEE Transactions on Computers, pp. 133–141, February 1979. For a state-of-the-art view of CPU caches, reference should be made to Computing Surveys, Volume 14, No. 3, September 1982, pp. 473–530.

THE INVENTION

It is an object of this invention to increase the execution rate of CPU processes (channel programs) referencing storage subsystems. It is a related object to substantially reduce the data transfer among stages in a hierarchical storage system. More particularly, it is an object to reduce said data transfer between DASD and DASD cache while avoiding the complexity of managing variable length records in the cache.

These objects are satisfied by a CPU-implementable method for the replacement of fixed block extents of information in a directory managed DASD backed cache in which each block either spans at least one variable length record or is itself one of several blocks spanning a single variable length record. The method is invoked by reference to an unavailable (missed) record in the cache. The method steps comprise blocking and staging records to the cache, starting at the DASD reference track from the missed record, and continuing until either a fixed block is spanned, if the end of track is reached, or a record already in the cache is encountered. This is subject to the constraints that: (a) if the missed record is less than a block extent, it is necessary to ascertain whether any record in the block has already been staged to the cache. The first such record in the block and all succeeding records in the block being deleted from the block in the event the identities match. (b) Otherwise, if the missed record is greater than a block extent, then the first k nonrecently used blocks within the cache are allocated and the k block record is staged up.

In the cited prior art, Niguette describes the staging of fixed block transfers to cache. However, this reference neither treats the duplicate record problem, nor variable record lengths. Absent also is an allocation of contiguous space for record spanning multiple blocks.

The Nelson reference describes a method for selecting a block of storage in primary memory. The data blocks being transferred are of fixed length and boundary. Since the blocks form a nonoverlapping artition of memory, duplication of memory does not arise.

The copending Bardesley application relates to writing variable length records into noncontiguous blocks of linearly addressed buffer storage. Since it is not directory managed, as is the cache of this invention, no provision is made for duplicate record management in the cache sense.

The Easton reference describes the second chance algorithm used with modification in this invention for securing k contiguous blocks in cache. This facilitates locating k contiguous blocks in a buffer space where the length of the record exceeds the size of the block. In this clocking algorithm a "use" bit is turned on when data in the block is referenced. Next a cursor cycles through the set of block "use" bits in round robin order turning "off" the use bits as it advances. Upon k contiguous blocks being needed, then k contiguous blocks not recently used in cache are selected.

DESCRIPTION OF THE PREFERRED EMBODIMENT AND INDUSTRIAL APPLICABILITY

Caches and Units of Data

In current cache practice, units of data that are managed in the cache may start only at prescribed locations in secondary storage. These locations or boundaries are uniformly spaced. In CPU caches, all data between two successive boundaries are staged as a unit. In contrast, among some commercially available disk caches, staging may either begin at any record and end at a boundary or begin at a boundary and end at a particular record. However, the unit of data allocated is always the full amount between successive boundaries. In other disk caches, a full unit is always staged.

Stageability of DASD Tracks and Records

Since DASD architecture, as for example the IBM count key data (CKD) or CKD Extended (CKDE), restricts the unit of transfer to one or more records, and since the records may vary in length, the unit of allocation in current disk caches is the disk track and the boundaries are the initial point or starts of tracks. Since tracks contain typically many records, track staging involves movement of much more data than individual records needed by the programs. This leads to poor performance and sensitivity to low hit ratios. Alternatively, staging of individual records into the cache has limited appeal because of the complexity of managing variable length objects therein.

Comparison of CPU and DASD Caches in Typical Memory Hierarchy

Figure 1:
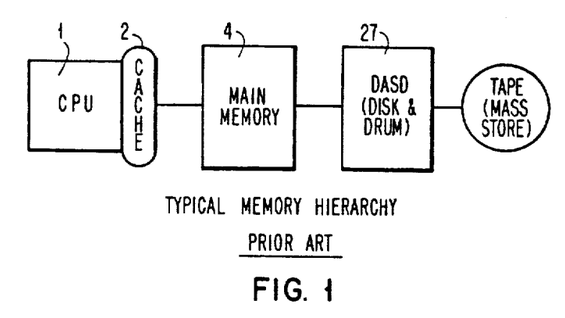
FIG. 1 depicts a typical prior art memory hierarchy.

Referring now to FIG. 1, there is shown a typical memory hierarchy in which a CPU 1 interacting with main memory 4 through a CPU cache 2. Reference is made to external or secondary storage 27 for that information not contained within the cache or main memory when referenced. The performance call of adding a cache memory to a computer is to make the average access time seen by the CPU as close as possible to that of the CPU cache. This too is the object in the use of DASD cache. As pointed out by Hayes, "Computer Architecture and Organization", McGraw Hill Computer Science Series, 1978, at pp. 385-388, there are some important differences between the cache main memory hierarchy and the main secondary storage hierarchy. Among these differences is that the operating speed required by the CPU cache is managed by high-speed logic circuits rather than software routines. On the other hand, the main memory secondary storage system is controlled by programs within the operating system in the CPU. Thus, while the storage system hierarchy may be transparent to any executing applications process it is visible to the systems processes. In contrast the CPU cache and main memory is transparent to both.

Multi-CPU Sharing Access to DASD

Figure 2:
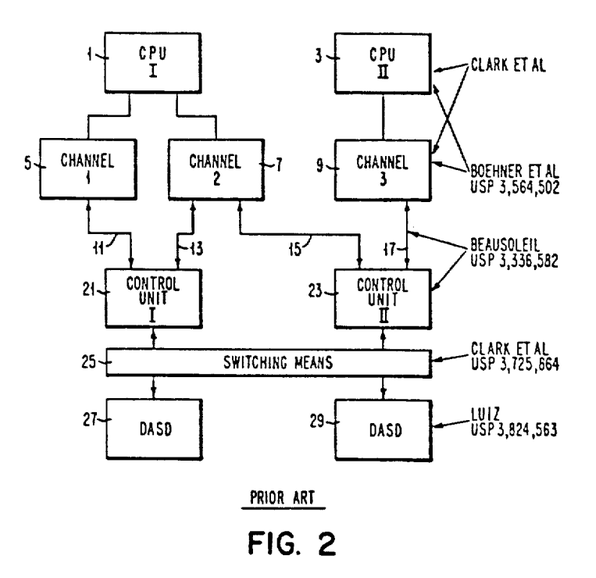
FIG. 2 sets out a prior art systems configuration where multiple CPU's share access to multiple DASD's.

Referring now to FIG. 2, there is shown a first 1 and second 3 CPU coupled to corresponding control units 21 and 23 over channels 1 and 2 (paths 11, 13) and channels 2 and 3 (paths 15, 17). The control units share access to DASD's 27 and 29 over switching means 25. It should be appreciated that a CPU's relationship to DASD begins when the CPU invokes the START I/O instruction. This instruction serves to establish a connection between the CPU and an address device and the execution of a channel program with the device. The invocation of the START I/O instruction causes control to be relinquished to a series of channel commands. This series or chain of channel commands (CCW's) is, in turn, sent over the channel to the control unit for selecting and accessing the device and affectuating any data movement across the interfaces. Each channel program consists of a sequential list of operations resident in the CPU main memory. The transmission 2 and execution at the control unit of the CCW's takes place only after an initial connection between the CPU and the control unit takes place. For each operation (CCW) in the channel program, one or more counterpart operations are required either at the control unit or device level over an active connection. Of course, the list or CCW sequence may be discontinuously executed (segmented).

The first act of connection is that of an initial selection sequence. This sequence is invoked with a START I/O operation in which an initial path is set up both electrically and logically in terms of device address (virtual/real) and device status (available/busy). The next active connection relates to that of CCW transfer and execution. A control CCW such as a SEEK requires physical positioning or activity at the device. The control unit in response to receipt of a control CCW can execute the CCW in disconnected mode. This means that the control unit disconnects from the channel while executing the indicated operations. The control unit does not require any more channel activity until it reconnects to the channel. In a typical IBM 370 system as described for example in Clark et al, U.S. Pat. No. 3,725,864, Beausoleil, U.S. Pat. No. 3,336,582, and Boehner et al, U.S. Pat. No. 3,564,502, after a control unit has received a SEEK CCW and the parameters (target address), it disconnects for 30 milliseconds or more. Thirty milliseconds is an average time it takes to dispatch an accessing arm of a DASD in order to arrive at the tracks of a cylinder of interest. During this "dead time" both the channel and the control unit are free to establish other connections. In contrast to disconnected modes, CCW's involving the movement or transfer of data between the channel and the device such as READ or WRITE CCW's require the control unit to remain connected to the channel in order to effectuate data transfer.

Each CCW must be obtained from the list in the CPU main memory and transferred over to the channel to the control unit. At the control unit the CCW is executed. Subsequent to execution there occurs an ending sequence. If the CCW is of the control type requiring device positioning, the control unit disconnects from the channel and must also reconnect when the control or device positioning has been completed. It is then followed by an ending sequence.

Embedding DASD Cache in a Shared Access System

Figure 3:
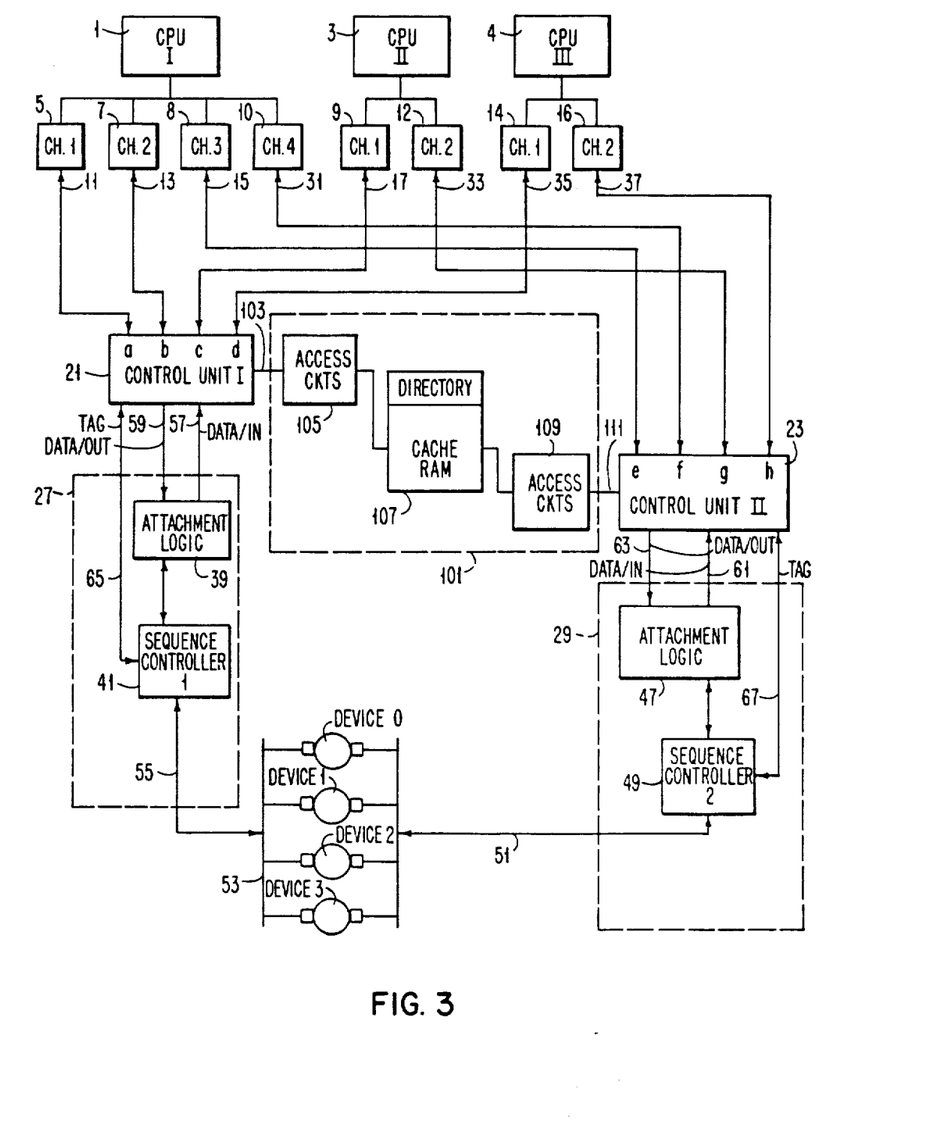
FIG. 3 sets out a set of DASD's having diverse access paths with the inventive cache managed at the storage control unit level.

Referring now to FIG. 3, there is shown a multi-CPU and shared DASD configuration within which the invention is embedded. Three CPU's 1, 3, 4 are suitably cross-connected to a pair of control units 21 and 23 over counterpart channels. In this regard, CPU 1 attaches four channels 5, 7, 8, and 10. CPU 3 attaches two channels 9 and 12 while CPU 4 attaches two channels 14 and 16.

Channels 1 and 2 terminate in control unit 21 ports A and B while channels 3 and 4 terminate in control 23 ports E and F. Channel 1 terminates in control unit 21 port C with channel 2 attaching control unit 23 at port G. Lastly, channel 1 drives port D of control unit 21 with channel 2 driving port H of control unit 23.

Referring again to FIG. 2, it is seen that control units 21 and 23 attach devices 53 through DASD controllers 27 and 29 over a demand/response interface embracing tag and data lines. The interface between control unit 21 and DASD controller 27 includes tag line 65 and data-/in and data/out 57 and 59. Likewise, tag lines 67 and data/in and data/out paths 61 and 63 couple control unit 23 to DASD controller 29.

The demand/response type interface is one in which the tag out identifies and validates the information on the data line out and vis-a-vis. In this regard, each CPU/control unit/device operates asynchronously with respect to one another in which directional control is asserted from the top down. Between the control units 21 and 23 there is juxtaposed a cache 101 access either through controller 21 over path 103 and access circuits 105 or through control unit 23 over path 111 through access circuits 109. The cache proper may consist of a RAM in a suitable high-speed main memory technology such as CMOS. Configuration of a DASD cache suitable for the practice of this invention may be found in the IBM 3880 storage control unit model 13 described in IBM publication GA32-0062-0 this model is designed as a high-performance cache DASD subsystem for use with System 370 and especially MVS/SP Release 3 operating systems. The 3880 model 13 has two control units such as depicted in FIG. 3 and a cache of 4 to 8 megabyte capacity forming cache 101.

A set of DASD 53 includes devices 0-3 each accessible through a device attachment unit over separate paths. Attachment unit 27 provides a path through control unit 21 to any of the devices over line 55. Line 55 electrically terminates in a dispatchable arm containing a READ/WRITE head per device. Similarly, attachment 29 provides an independent access path between control unit 23 over line 51 to another dispatchable arm per device. Each attachment contains its respective attachment logic (39, 47) and sequence controller (41, 49).

DASD Cache and Data Movement

Active connection between elements for executing operations is necessary for extended periods only in respect of the movement of data. Either control unit 21 or 23 responsive to a READ CCW accesses the cache directory to ascertain if the data is resident. If there is a "hit", movement is between the RAM and the channel through the control unit. In the case of a WRITE CCW, movement is from the channel to the cache through the control unit. If the cache is of the "write-in" type and there is a "hit" (space available or record to be updated), then data is written therein and subsequently copied to the DASD. If the cache is of the "write-through" type then data is written independently into cache and DASD.

The Cache Directory

It is to be appreciated that a cache provides a large random access memory that holds copies of some of the records of the disk. If cache 101 is operated as a "write-in", then the random access memory 107 also may hold records that have been sent to the disk from the attached processors that have not yet been written upon them. A directory describes the contents for a disk cache using block allocation. The directory is also stored in random RAM 101 and consists of track and block descriptor tables. These are set out in FIG. 4. Cache space is divided into fixed size blocks. A block contains one or more adjacent records from a disk track along with the record identity (ID) fields. Additionally, flag information for modifying records may also be stored. Track gaps between the count, key, and data fields of a record are not stored.

Figure 4:
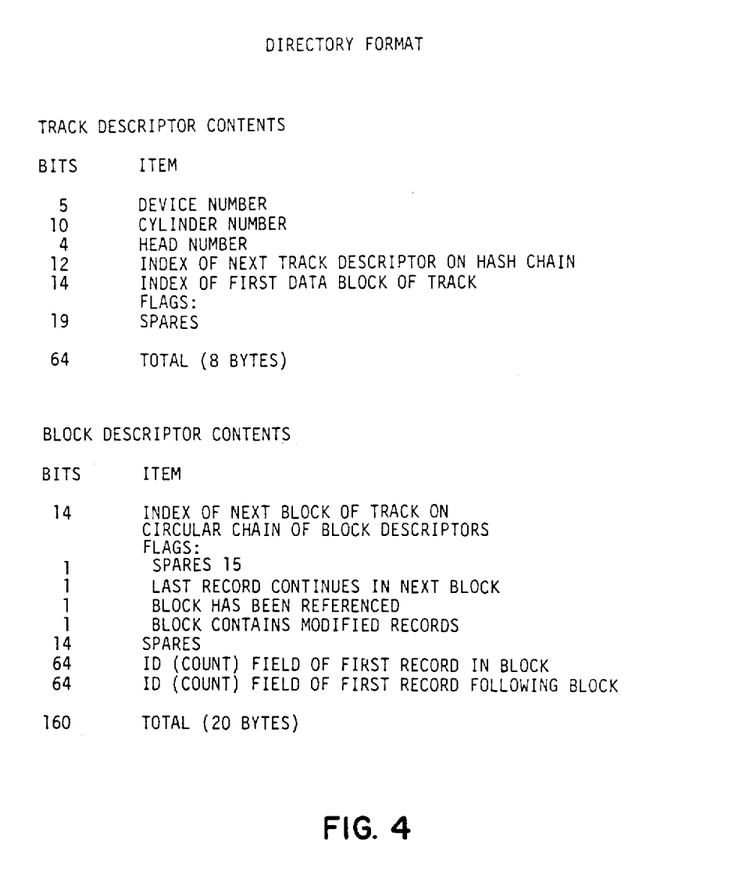
FIG. 4 is a DASD cache directory format of the DASD track and block descriptors.

The block descriptors for a track should be chained together in a circular list. The chain should be entered at the first block of the track from a pointer in the track descriptor entry. Block descriptors are chained in the order that their records occur in the track. Directory lookup uses hash coding in order to find the track descriptor. The lookup then follows the block chain in order to ascertain the requested records.

A track may be only partially present in the cache. Records can be missing only between blocks. The relationship between cache blocks for a given track is recorded by storing the ID field of both the first record of a block and the first record following a block.

Block descriptors are stored in data areas numbered 1 through n. The data blocks of the cache are also stored in data areas numbered 1 through n. The block descriptors stored in location i always refers to data block i. Blocks containing alternating data (or key) fields and record ID (count) fields, starting with the data (key) of the first record and ending with the data (key) field of the last record. The ID of a record other than a first record in a block is stored in the data block. For a nominal 4096 byte block size, the space available for record ID fields in the cache block plus the block descriptor can be an additional 54 bytes in order to accommodate eight 512 byte records and their ID's or larger. In the case where the cache is treated as nonvolatile (a "write-in" cache) then one bit of the ID field serves as an indicator that the record has been modified. Also, the size of the directory is dominated by the block descriptors. A 20-byte descriptor for each of the 4096 byte blocks represents a directory overhead of less than one percent.

Block Staging Procedures

The following is a description of necessary procedures for invoking and executing the method of this invention. These procedures are executed by the cache manager portion of the operating system equivalent resident in control units 21 and/or 23. The procedures include:

1. Block allocation.
2. The reading or writing of a record.
3. Format write.
4. Checking duplicates of records or keys.
5. Obtaining the next record.

Block Allocation

Block allocation is a protocol invoked before a new block or blocks of data are staged into cache 101. First, a cursor designated CURSOR is initialized at value 1. The CURSOR is incremented by the value 1. In the event the value reached is n+1 it is wrapped around and set to 1.

Allocation of a single block of data requires that the block has a reference bit examined in the block descriptor whose index is the value of the CURSOR. If the bit is "off" then the data block of the same index value is selected for allocation. The CURSOR is then incremented and the operation terminated. However, if the use bit is "on", then the bit is turned off and the CURSOR is incremented. The operation returns to examining the block descriptor.

Allocation of k adjacent data blocks requires the following protocol steps:

1. Initialize a variable called counter to zero.
2. Examine the block use bit in the block descriptor whose number is the value of the CURSOR. If the use bit is "off" then the counter value is incremented. On the other hand if the bit is "on", or if the value of CURSOR has just been set to 1, then the bit is turned "off" and the counter value is set to zero.
3. Increment the CURSOR by +1 and if the counter value is less than k then return to step 2.
4. Select for allocation those blocks whose numbers correspond to the last k values of CURSOR.

If the cache is operated as a "write-in", then the "block contains modified records" bit is checked for each block chosen for allocation. Those records in the blocks that have been changed are written to DASD.

Record READ/WRITE

In the reading or writing of a record the beneficial procedure uses a 64-bit field arbitrarily designated TEMPC. This field is also used by the duplication checking procedure. The reading or writing of the record utilizes the following steps:

1. Use a requesting track ID formed by the concatenation of its device number, cylinder number, and head number by way of hash table lookup in order to find the track descriptor entry in the cache directory.

2. In the case of hash table collision, the "index of next track descriptor on hash chain" in the track descriptor entry can be used to find the required entry. Note, if the track ID is not found, then the record is not present in the cache. A track descriptor entry is created for this track in this case. However, if the track ID is found then the "index of first data block of track" is obtained from the descriptor entry. The chain of block descriptors is then searched using the "index of next block of track field" present in each entry.

3. If the search finds the requested ID field, then the record is transmitted from the cache to the control unit in the case of a READ or from the control unit to the cache in the case of WRITE.

4. If the search does not find the requested ID field, then the size of the record is obtained from the control unit as received from the channel. This includes the number of blocks required and is considered to be the smallest integer not exceeding the record size divided by the block size. In the absence of a designation of record size then one block is allocated. The operation is retried if this is insufficient.

If one block is allocated then the record, along with as many successive records from its tracks as can fit in a block, are staged into the cache. For a WRITE, the record is written to DASD and the successive records are staged from DASD to the cache. The ID field of the first record that cannot fit into the block is read into the TEMPC field. The subsequently to be described duplication check procedure is used to prevent staging duplicate records. A block descriptor entry for the new block is written and its index is inserted in the chain of block descriptors for the track. The "ID field of the first record following block" is obtained from the TEMPC field.

If more than one block is allocated, then only the requested record is staged into these blocks, followed by the record ID of the next record of the track. For a WRITE, only the record ID of the next record of the track is read from DASD. Block descriptor entries for the new blocks are written and the indices are inserted in the chain of block descriptors for the track. The "last record continues in next block" bit is set "on" in each such block descriptor except the last. The ID field of the next record after this one, which is read in with the current data record is stored in the "ID field of first record following block" field of the last block descriptor.

If the cache is a "write-in" cache and if the channel made a WRITE reference, then the "block contains modified records" bit is set "on" in the block descriptor and the "record modified" bit in the record ID is set "on". On the other hand, if the cache is not a "write-in" cache then the record is written to disk.

FORMAT WRITE

FORMAT WRITE is the same as "write a record" with the exception that the staging from disk and the subsequent checking for duplicates processing is omitted. Also, if the record to be written is the "next" after a record R that already is contained in a single block of a cache, and if the new record can fit into this block following record R then step 4 of reading or writing a record is omitted. Instead, the new record is written into the cache in the position following record R. Additionally, any of the blocks in the cache from the specified track that follow the written record are deleted. Lastly, if the block containing the written record is already in the cache, then any records following that record within its block are deleted.

The Checking of Duplicate Records

This procedure is applied after a block has been staged from disk but before the new block descriptor entry is written. The following steps include:

1. Ascertaining the track descriptor for the block and the "index of first data block of the track".

2. For each record ID field in succession in the new block, starting with the first, searching the chain of block descriptors of its track using the "index of next block of track" field present in each entry. If a record ID is found to be already in the cache then its value is stored in the TEMPC field and the record is deleted along with the entire remaining part of the new block. The procedure then terminates. If no matching ID from the new block is already in the cache then the procedure terminates.

Obtaining the Next Record

A sequence of CCW's occasionally implicitly refers to the "next" record on a track. In the case of a FORMAT WRITE, the ID of the next record will be supplied by the incoming CCW sequence. Otherwise, if reference to a "next record" occurs when the previous record accessed by the current CCW sequence is in the cache but is not the last in its block, then the next entry is simply the next entry in the data block. Also, if the last record in a cache block has just been accessed and then the succeeding record on the track is required, then the ID of the next record is obtained from the "ID field of first record following block" in the block descriptor.

Miscellaneous Aspects

Figure 5:
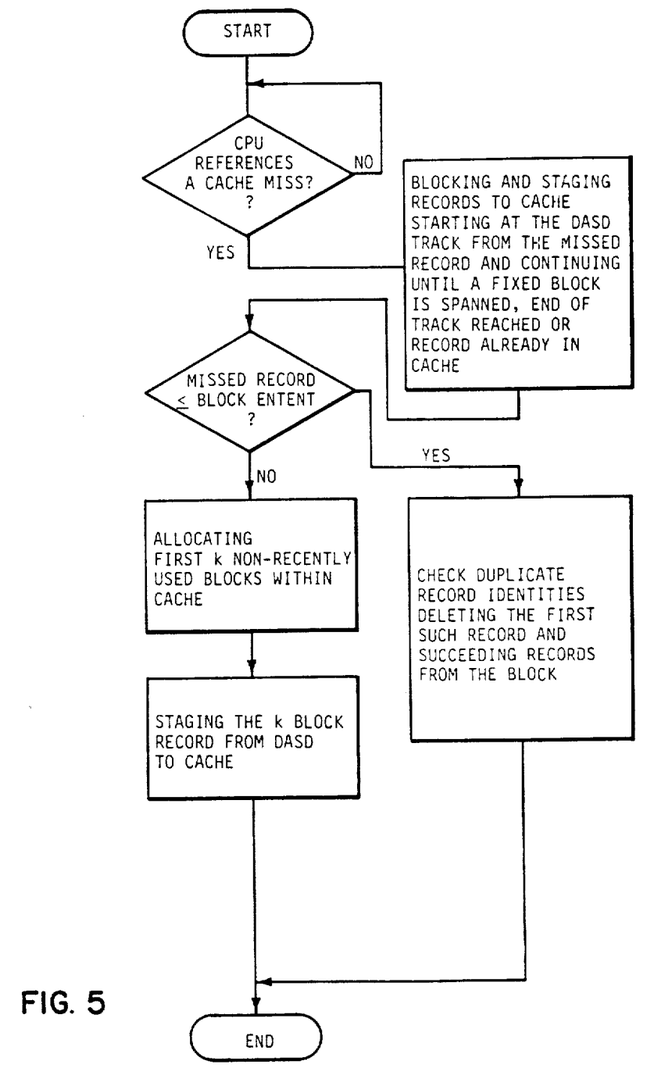
FIG. 5 shows a flow diagram of the method steps of the invention.
Figure 6:
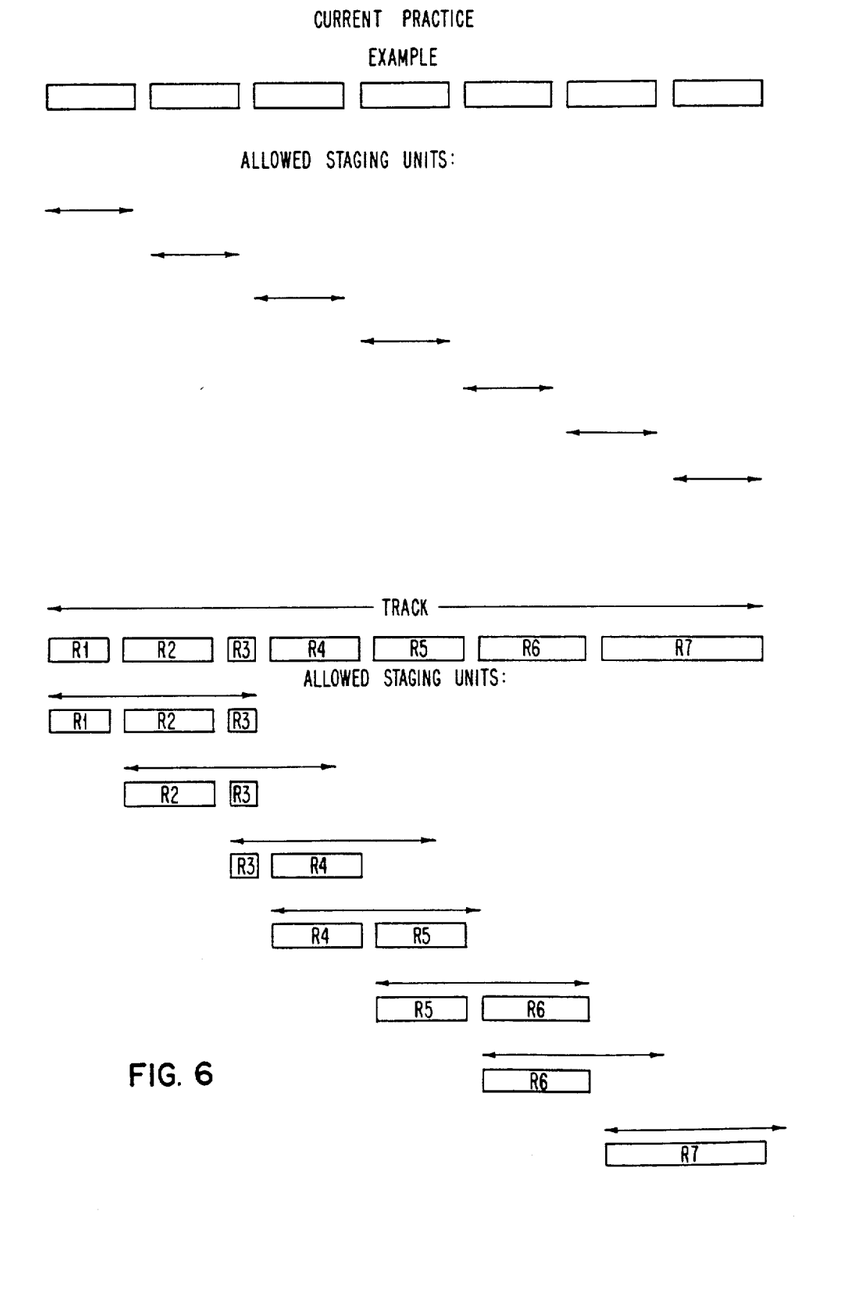
FIG. 6 depicts the current staging and fixed blocks compared with the blocking of variable length records in fixed extents for staging.

Referring now to FIG. 6, there is shown the current practice of staging units in fixed length blocks. This is contrasted with the packing of variable length blocks in fixed extents and stagings starting from the missed record on the track according to the invention. Referring now to FIG. 5, there is shown a high-level flow diagram of the method steps. Differential processing starts as a function of whether the missed record exceeds a block extent.

An additional aspect is the separate staging of keys. Upon implementation, then a key search which is a "miss" causes the upstaging of the required key into a new block followed by as many succeeding keys on the track as will fit in the block. The rules for avoiding duplication of keys is as indicated for records. The value of this option is that keys of records not in the cache may be in the cache. This shortens search times.

While this invention has been particularly shown and described with reference to both READ and WRITE cache referencing, mention should be made of writing references with significant amounts of data. Invention will be operative as long as a facility is provided for knowing the data extent. This can be done in a variety of manners as for example by having a buffer fillable to a maximum capacity or a parameter supplied by the channel CCW to the control unit. Lastly, the embodiments described and others will be understood by those skilled in this art such that changes in the form and detail may be made therein without departing from the spirit and scope of the invention.

We claim:

1. A method for replacing fixed block extends of information in a DASD-backed LRU cache managed through a cache directory, each block either spanning at least one variable length record, or being one of several blocks spanning a single record, said method being invoked by reference to an unavailable or missed record in the cache, comprising the steps of:

blocking and staging records from the DASD to the cache, said blocking and staging including comparison matching the DASD and cache stored record identities; and copying onto the cache the DASD-recorded consecutive bytes of information starting at the DASD reference track from the missed record, and continuing until either a fixed block is spanned, the end of track is reached, or a record already in the cache is encountered such that:

(a) if the missed record spans less than a block extent, ascertaining whether any record in the block has already been copied into the cache and deleting the first such record and all succeeding records from the block; or (b) if the missed record spans more than a block extent, allocating at least the missed record spanning equivalent of the least recently used blocks within the cache and copying said missed record into the cache from the DASD.

2. A method according to claim 1, wherein:

the cache directory includes DASD track and block descriptors in which the block descriptors are chained to form a circular list and further wherein each block has associated therewith a use bit; and the step of blocking and staging records to cache if the missed record spans more than a block extent includes the steps of (a) turning the use bit on when data in the block is referenced in the cache;

(b) cycling a cursor through the set of block use bits in round robin order and turning the use bit off as the cursor advances; and (c) upon a preselected number of contiguous blocks being needed, selecting the first least recently used contiguous blocks whose use bits are marked off equivalent to the missed record spanning distance.

3. A method according to claim 1 in which the cache is either of the write-through or of the write-in types.

4. A new use of a data processing system comprising at least a first and second CPU; shared DASD devices; a plurality of sets of fan out paths (channels), each path set coupling a corresponding CPU as a source node; and a plurality of control nodes, each control node including means for accessing the devices and for selectively intercepting predetermined paths from either set in order to complete a single path connection to a single destination device; and a cache LRU managed through a directory coupling and operatively engaging said control nodes, said new use comprising a method for replacement of fixed block extents of information in the cache, each block either spanning at least one variable length record, or being one of several blocks spanning a single record, said method being invoked by reference by either CPU to an unavailable or missed record in the cache, comprising the steps of:

blocking and staging records to the cache, said blocking and staging including comparison matching of the DASD and cache stored record identities; and copying onto the cache the DASD-recorded consecutive bytes of information starting at the DASD reference track from the missed record, and continuing until either a fixed block is spanned, the end of track is reached, or a record already in the cache is encountered such that:

(a) if the missed record spans less than a block extent, ascertaining whether any record in the block has already been copied into the cache and deleting the first such record and all succeeding records from the block; or (b) if the missed record spans more than a block extent, allocating at least the missed record spanning equivalent of the least recently used blocks within the cache and copying said missed record into the cache from the DASD.

5. A new use according to claim 4, wherein the directory for each cache contains track and block descriptors in which the block descriptors are chained to form a circular list, and the steps of blocking and staging records to cache includes the steps of finding the track descriptor entry in the respective cache directory by using a requesting track identity by way of a hash table lookup.

6. A new use according to claim 4, wherein after a block has been staged from DASD, checking for duplicate records within the respective cache directory and deleting such records and all succeeding records from the block just staged.

7. A new use according to claim 4, wherein each control node includes a cache manager resident within and executable by the control nodes, said cache manager constituting a portion of an operating system equivalent for said nodes.

* * * * *